(12) United States Patent
Hattori et al.

(10) Patent No.: US 12,122,304 B2
(45) Date of Patent: Oct. 22, 2024

(54) INSTALLATION DEVICE

(71) Applicants: KABUSHIKI KAISHA TOKAI-RIKA-DENKI-SEISAKUSHO, Aichi (JP); IMASEN ELECTRIC INDUSTRIAL CO., LTD., Aichi (JP)

(72) Inventors: Tomomi Hattori, Aichi (JP); Takuo Tooyama, Aichi (JP); Kazuki Kozuka, Aichi (JP)

(73) Assignees: KABUSHIKI KAISHA TOKAI-RIKA-DENKI-SEISAKUSHO, Aichi (JP); IMASEN ELECTRIC INDUSTRIAL CO., LTD., Aichi (JP)

( * ) Notice: Subject to any disclaimer, the term of this patent is extended or adjusted under 35 U.S.C. 154(b) by 112 days.

(21) Appl. No.: 17/802,659

(22) PCT Filed: Feb. 1, 2021

(86) PCT No.: PCT/JP2021/003592
§ 371 (c)(1),
(2) Date: Aug. 26, 2022

(87) PCT Pub. No.: WO2021/171924
PCT Pub. Date: Sep. 2, 2021

(65) Prior Publication Data
US 2023/0108694 A1 Apr. 6, 2023

(30) Foreign Application Priority Data
Feb. 28, 2020 (JP) ................. 2020-034182

(51) Int. Cl.
*B60R 11/04* (2006.01)
*B60Q 1/26* (2006.01)
(Continued)

(52) U.S. Cl.
CPC ............ *B60R 11/04* (2013.01); *B60Q 1/2607* (2013.01); *B60Q 1/2696* (2013.01); *B60Q 1/503* (2013.01);
(Continued)

(58) Field of Classification Search
USPC ........................................................ 348/148
See application file for complete search history.

(56) References Cited

U.S. PATENT DOCUMENTS 11,831,971 B2 * 11/2023 Tokito .................... H04N 23/51
2003/0146282 A1 * 8/2003 Tsikos .................... B82Y 15/00
235/454
(Continued)

FOREIGN PATENT DOCUMENTS

JP 2006-231988 A 9/2006
JP 2011-184030 A 9/2011
(Continued)

OTHER PUBLICATIONS

PCT Search Report, Apr. 13, 2021, 2 pages.

*Primary Examiner* — Nigar Chowdhury
(74) *Attorney, Agent, or Firm* — Dority & Manning, P.A.

(57) ABSTRACT

In a camera device, light is emitted from a turn lamp, a caution lamp, and a welcome lamp. Here, the turn lamp, the caution lamp, and the welcome lamp are provided in a lamp unit. Thus, it is possible to reduce a space between the turn lamp, the caution lamp, and the welcome lamp and reduce the arrangement space of the turn lamp, the caution lamp, and the welcome lamp.

11 Claims, 6 Drawing Sheets

(51) Int. Cl.
  *B60Q 1/50* (2006.01)
  *B60R 1/26* (2022.01)
  *F21S 43/14* (2018.01)
  *F21S 43/237* (2018.01)
  *F21Y 115/10* (2016.01)
  *H04N 23/57* (2023.01)

(52) U.S. Cl.
  CPC ............... *B60R 1/26* (2022.01); *F21S 43/14* (2018.01); *F21S 43/237* (2018.01); *F21Y 2115/10* (2016.08)

(56) References Cited

U.S. PATENT DOCUMENTS

| | | | | |
|---|---|---|---|---|
| 2011/0163904 | A1* | 7/2011 | Alland | B60R 11/04 |
| | | | | 342/52 |
| 2012/0034954 | A1* | 2/2012 | Tabe | H04M 1/6083 |
| | | | | 455/566 |
| 2016/0207444 | A1* | 7/2016 | Tatara | B60Q 1/381 |
| 2017/0015180 | A1* | 1/2017 | Sakamoto | B32B 17/10761 |
| 2019/0028618 | A1* | 1/2019 | Bippus | H05K 1/0213 |
| 2019/0039531 | A1* | 2/2019 | Wilson | B60S 1/528 |
| 2019/0061641 | A1* | 2/2019 | Kikuchi | B60J 1/00 |
| 2019/0082082 | A1* | 3/2019 | Hashimoto | B60R 11/04 |
| 2019/0158765 | A1* | 5/2019 | Kuybeda | H04N 23/57 |
| 2019/0279447 | A1* | 9/2019 | Ricci | B60R 25/01 |
| 2019/0337466 | A1* | 11/2019 | Oba | B60R 1/00 |
| 2020/0017164 | A1* | 1/2020 | Saeki | B62J 6/01 |
| 2020/0101889 | A1* | 4/2020 | Iwai | G01S 13/931 |
| 2020/0119474 | A1* | 4/2020 | Owaki | H01R 12/716 |
| 2020/0139962 | A1* | 5/2020 | Kim | B60W 10/18 |
| 2020/0163258 | A1* | 5/2020 | Hatano | H05K 9/0018 |
| 2020/0244856 | A1* | 7/2020 | Kim | H04N 23/52 |
| 2020/0296287 | A1* | 9/2020 | Min | G02B 7/08 |
| 2021/0016704 | A1* | 1/2021 | Philipp | B60Q 1/0023 |
| 2021/0040329 | A1* | 2/2021 | Decker | C09D 7/61 |
| 2021/0232642 | A1* | 7/2021 | Ricci | A61B 5/0077 |

FOREIGN PATENT DOCUMENTS

| | | |
|---|---|---|
| JP | 2012-171535 A | 9/2012 |
| JP | 2014-193696 A | 10/2014 |
| JP | 2016-134226 A | 7/2016 |

* cited by examiner

INSTALLATION DEVICE

CROSS-REFERENCE TO RELATED APPLICATIONS

The present application is related and has right of priority to JP 2020-034182, which was filed on Feb. 28, 2020 in the Japanese Patent Office, and is a U.S. national phase entry of PCT/JP2021/003592, which was filed on Feb. 1, 2021, both of which are incorporated by reference in their entireties for all purposes.

TECHNICAL FIELD

The present invention relates to an installation device provided with an electromagnetic wave device and an imaging device.

BACKGROUND ART

The peripheral view monitoring device described in Japanese Patent Application Laid-Open (JP-A) No. 2014-193696 includes a side turn lamp (electromagnetic wave device) provided at a housing and a camera body (imaging device) provided at a camera, in which the housing and the camera are assembled.

In such a peripheral view monitoring device for vehicle, if a plurality of electromagnetic wave devices are provided in addition to a camera, it is preferable that the arrangement space of the plurality of electromagnetic wave devices can be reduced.

SUMMARY OF INVENTION

Technical Problem

In view of the above fact, an object of the present invention is to obtain an installation device capable of reducing the arrangement space of a plurality of electromagnetic wave devices.

Solution to Problem

An installation device of a first aspect of the present invention includes an installation body to be installed at a vehicle; an electromagnetic wave unit, being a component of the installation body, the electromagnetic wave unit being provided with a plurality of electromagnetic wave devices that process an electromagnetic wave between the electromagnetic wave devices and an outside of the installation body; and an imaging unit, being a component of the installation body, the imaging unit being assembled with the electromagnetic wave unit and being provided with an imaging device that images the outside of the installation body.

An installation device of a second aspect of the present invention, in the installation device of the first aspect, further includes a transmissive member provided at the electromagnetic wave unit, the transmissive member transmitting the electromagnetic wave between the outside of the installation body and the plurality of electromagnetic wave devices.

In an installation device of a third aspect of the present invention, the electromagnetic wave unit protrudes from the vehicle when the installation body is stored in the installation device of the first or second aspect.

An installation device of a fourth aspect of the present, in the installation device of any one of the first to third aspects, further includes a covering part provided at the installation body, the covering part covering a gap between the installation body and the vehicle when the installation body is stored.

An installation device of a fifth aspect of the present, in the installation device of any one of the first to fourth aspects, further includes a plurality of outer peripheral members provided at an outer periphery of the electromagnetic wave unit, the outer peripheral members being assembled to each other to assemble the electromagnetic wave unit.

Advantageous Effects of Invention

In the installation device of the first aspect of the present invention, the installation body is installed at the vehicle, the installation body includes the electromagnetic wave unit and the imaging unit, and the electromagnetic wave unit and the imaging unit are assembled. The electromagnetic wave unit is provided with the electromagnetic wave device, and the electromagnetic wave device processes electromagnetic waves between the electromagnetic wave device and the outside of the installation body. The imaging unit is provided with an imaging device, and the imaging device images the outside of the installation body.

Here, the plurality of electromagnetic wave devices are provided at the electromagnetic wave unit. This configuration can reduce the arrangement space of the plurality of electromagnetic wave devices.

In the installation device of the second aspect of the present invention, the transmissive member is provided at the electromagnetic wave unit, and the electromagnetic wave between the outside of the installation body and the plurality of electromagnetic wave devices passes through the transmissive member. This configuration enables the plurality of electromagnetic wave devices to share the transmissive member.

In the installation device of the third aspect of the present invention, the electromagnetic wave unit protrudes from the vehicle when the installation body is stored. This configuration enables the electromagnetic wave device to process the electromagnetic wave between the electromagnetic wave device and the outside of the vehicle even when the installation body is stored.

In the installation device of the fourth aspect of the present invention, when the installation body is stored, the covering part of the installation body covers the gap between the installation body and the vehicle. This configuration can inhibit the gap between the installation body and the vehicle from being visually recognized when the installation body is stored.

In the installation device of the fifth aspect of the present invention, the plurality of outer peripheral members are provided at the outer periphery of the electromagnetic wave unit, and the plurality of outer peripheral members are assembled to each other to assemble the electromagnetic wave unit. This configuration enables an easy assembling of the electromagnetic wave unit.

DESCRIPTION OF EMBODIMENTS

Figure 1A:
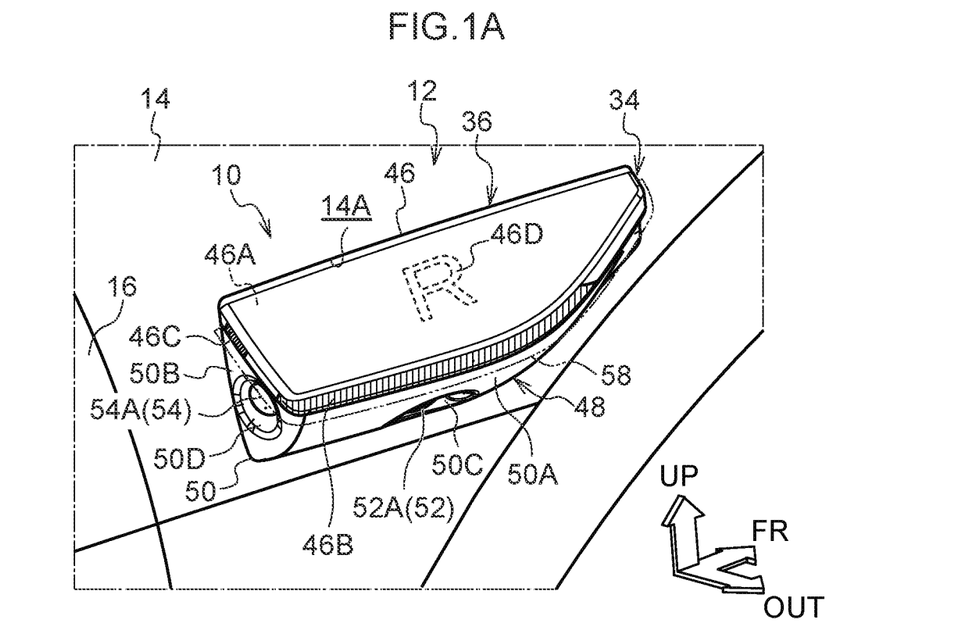
FIG. 1A is a perspective view of an installation body of a camera device according to an embodiment of the present invention when the installation body is deployed and viewed from a vehicle rear side and a vehicle width direction outer side.
Figure 2:
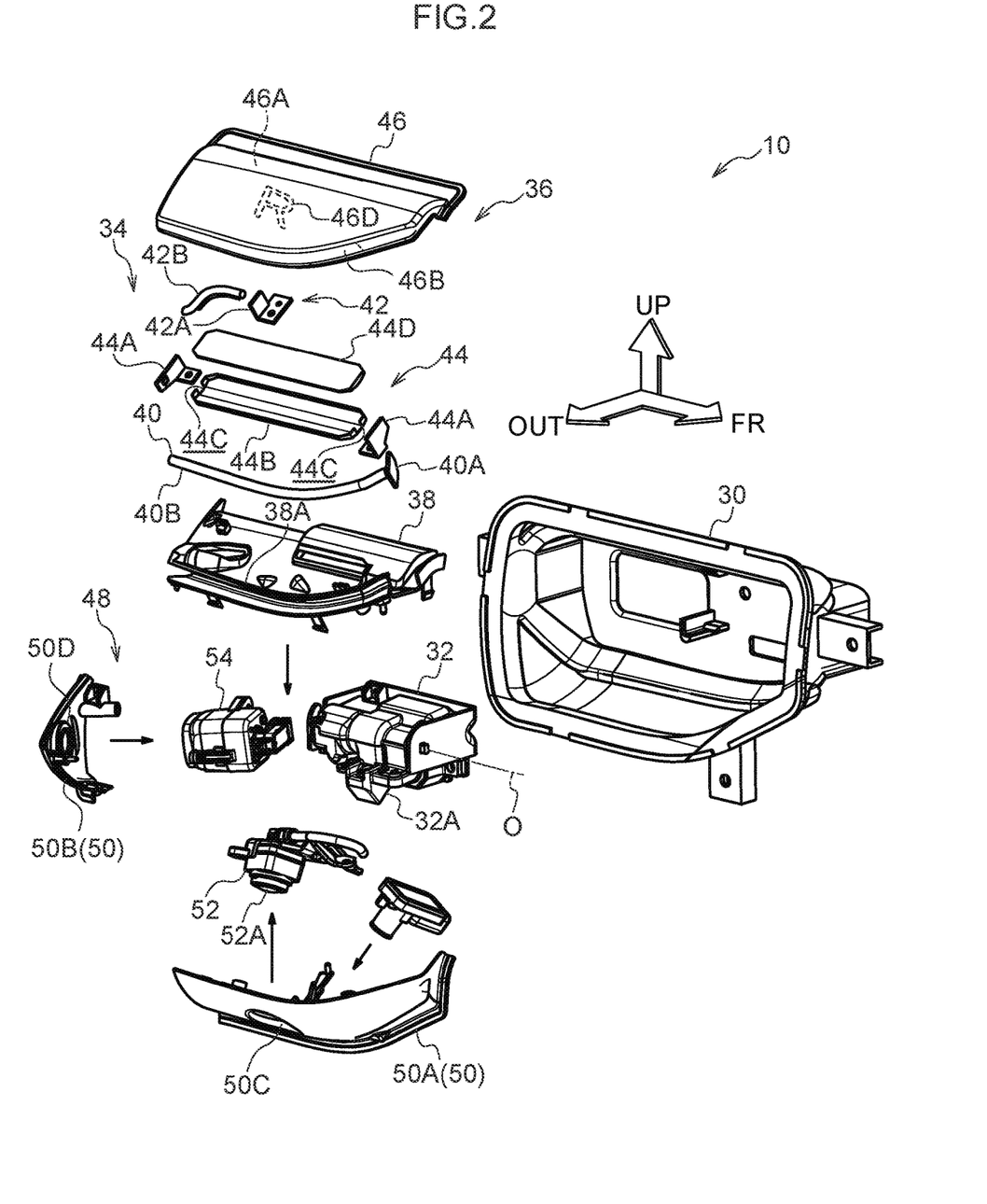
FIG. 2 is an exploded perspective view of the camera device according to the embodiment of the present invention as viewed from a vehicle front side and the vehicle width direction outer side.

FIG. 1A is a perspective view of a camera device 10 as an installation device according to an embodiment of the present invention viewed from a vehicle rear side and a vehicle width direction outer side (right side of a vehicle), and FIG. 2 is an exploded perspective view of the camera device 10 viewed from a vehicle front side and the vehicle width direction outer side. In the drawings, the front direction of the vehicle is indicated by an arrow FR, the outward direction in the vehicle width direction is indicated by an arrow OUT, and the upper direction is indicated by an arrow UP.

As illustrated in FIG. 1A, the camera device 10 according to the present embodiment is installed on a fender panel 14 (front fender panel) having a plate shape as an installation target of a vehicle 12 (automobile). An installation hole 14A having a substantially rectangular shape is formed through an up-down direction intermediate part of the vehicle rear side end part of the fender panel 14. The installation hole 14A extends in the front-rear direction of the vehicle, whose vehicle front side part at the lower end is inclined upward as it goes toward the vehicle front side.

A side door 16 (front side door) of the vehicle 12 is disposed on the vehicle rear side of the fender panel 14. The side door 16 is closed. A doorknob (not illustrated) is provided on the vehicle interior side of the side door 16. An occupant of the vehicle 12 operates the doorknob to enable the side door 16 to pivot to the vehicle width direction outer side with the vehicle front side end as the center and open.

Figure 3:
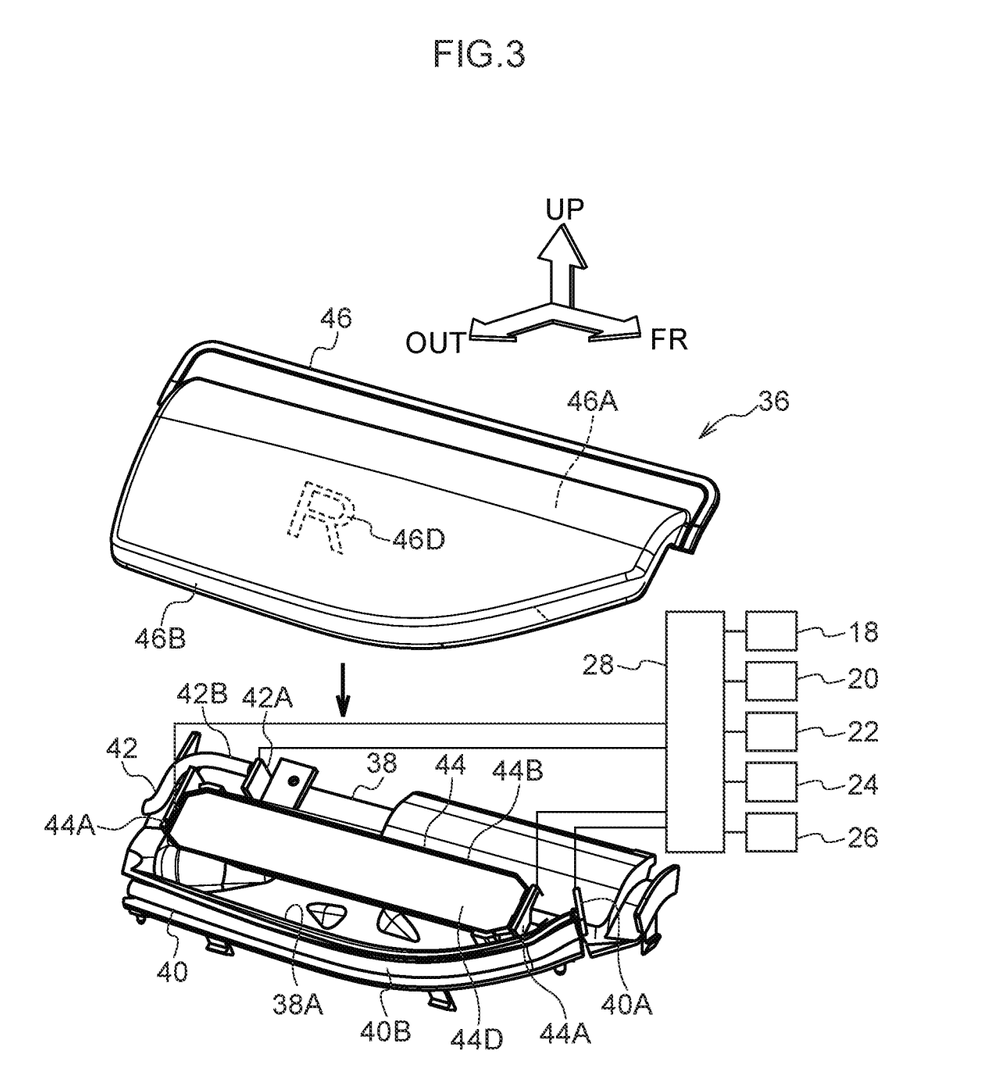
FIG. 3 is an exploded perspective view of a lamp unit of the camera device according to the embodiment of the present invention as viewed from the vehicle front side and the vehicle width direction outer side.

As illustrated in FIG. 3, the vehicle 12 is provided with a lock mechanism 18. When the occupant performs lock operation on the lock mechanism 18, the lock mechanism 18 restricts, for example, operation of the doorknob, and opening of the side door 16 is restricted. When the occupant performs an unlock operation on the lock mechanism 18, the lock mechanism 18 releases, for example, the operation restriction on the doorknob, and the opening restriction on the side door 16 is released.

The door knob of the side door 16 is provided with a contact sensor 20. The contact sensor 20 detects contact of the occupant with the doorknob. The vehicle 12 is provided with an opening/closing sensor 22. The opening/closing sensor 22 detects closing and opening of the side door 16. The vehicle 12 is provided with an approach sensor 24. The approach sensor 24 detects the approach of the occupant from the outside of the vehicle to the side door 16. The vehicle 12 is provided with an operation unit 26. The occupant actuates the operation unit 26 before changing the traveling direction of the vehicle 12 to the camera device 10 installation side (in the present embodiment, the right side).

The lock mechanism 18, the contact sensor 20, the opening/closing sensor 22, the approach sensor 24, and the operation unit 26 are electrically connected to a control device 28 (ECU) of the vehicle 12.

As illustrated in FIG. 2, a bracket 30 having a substantially rectangular parallelepiped box shape as an installation member is provided on the vehicle width direction inner side of the fender panel 14. The inside of the bracket 30 is open to the vehicle width direction outer side, and a vehicle front side part of the lower wall of the bracket 30 is inclined upward as it goes toward the vehicle front side. The bracket 30 is fixed to the fender panel 14 outside the outer periphery of the installation hole 14A. The inside of the bracket 30 is open to the vehicle width direction outer side of the fender panel 14 via the installation hole 14A.

A retractor 32 (see FIGS. 5B and 6) as a support is provided in the bracket 30. The retractor 32 is fixed to a vehicle width direction inner wall (bottom wall) of the bracket 30. The retractor 32 is provided with a pivoting part 32A as an operating part inside and is electrically connected to the control device 28. Under the control of the control device 28, the retractor 32 is operated to cause the pivoting part 32A to pivot about a pivot center axis O parallel to the vehicle front-rear direction.

As illustrated in FIGS. 1A and 2, the pivoting part 32A of the retractor 32 supports an installation body 34 having a substantially triangular prism shape. The installation body 34 is rotatable integrally with the pivoting part 32A. The installation body 34 is deployed. The installation body 34 protrudes to the vehicle width direction outer side of the fender panel 14 in a state of penetrating the installation hole 14A of the fender panel 14 at a vehicle width direction inner side part. When the retractor 32 is operated and the pivoting part 32A is caused to pivot to one side, the installation body 34 is caused to pivot downward and the vehicle width direction inner side to be stored (see FIG. 1B). When the retractor 32 is operated and the pivoting part 32A is caused to pivot to the other side, the installation body 34 is caused to pivot upward and the vehicle width direction outer side to be developed (returned).

A lamp unit 36 (see FIG. 3) as an electromagnetic wave unit is provided in an upper part of the installation body 34.

A lower part of the lamp unit 36 is provided with a housing 38 having a substantially rectangular plate shape as an outer peripheral member that forms a housing body. The housing 38 does not transmit light. The housing 38 is assembled to the pivoting part 32A of the retractor 32 (see FIG. 6). The housing 38 is inclined downward as it goes toward the vehicle width direction outer side. The vehicle front side part at the vehicle width direction outer side end of the housing 38 is inclined the vehicle width direction inner side as it goes toward the vehicle front side. A shielding plate 38A having a substantially U-shaped cross section as a shielding part is integrally formed on the housing 38. The shielding plate 38A is disposed on the vehicle width direction outer side end and a vehicle width direction outer side part of the vehicle rear side end of the housing 38. The inside of the vehicle width direction outer side part of the shielding plate 38A is open to the vehicle width direction outer side. The inside of the vehicle rear side part of the shielding plate 38A is open to the vehicle rear side. The vehicle front side end (the vehicle front side end of the vehicle width direction outer side part) of the shielding plate 38A opens the inside of the shielding plate 38A to the vehicle front side. The vehicle rear side end (the vehicle width direction inner side end of the vehicle rear side part) of the shielding plate 38A shields the inside of the shielding plate 38A to the vehicle width direction inner side.

The lamp unit 36 is provided with a turn lamp 40 as an electromagnetic wave device (first radiation device). The turn lamp 40 is provided with a turn circuit board 40A as a first emission part. The turn circuit board 40A is fixed to the vehicle front side of the vehicle front side end of the shielding plate 38A. The turn circuit board 40A is provided with an LED (not illustrated) and is electrically connected to the control device 28. Under the control of the control device 28, the turn lamp 40 is operated, and the turn circuit board 40A (LED) intermittently emits light (visible light, electromagnetic wave) from the vehicle front side of the vehicle front side end of the shielding plate 38A into the shielding plate 38A (vehicle rear side).

The turn lamp 40 is provided with a turn light guide 40B having a substantially columnar shape as a first guide part. The turn light guide 40B is disposed in the vehicle width direction outer side part of the shielding plate 38A and extends along the shielding plate 38A. The turn light guide 40B is transparent. The turn light guide 40B guides the light emitted from the turn circuit board 40A (LED) in the longitudinal direction and emits the light to the vehicle width direction outer side and the vehicle rear side.

The lamp unit 36 is provided with a caution lamp 42 as an electromagnetic wave device (second radiation device). The caution lamp 42 is provided with a caution circuit board 42A as a second emission part. The caution circuit board 42A is fixed to a part of the vehicle width direction inner side and the vehicle rear side on the housing 38. The caution circuit board 42A is provided with an LED (not illustrated) and is electrically connected to the control device 28. Under the control of the control device 28, the caution lamp 42 is operated, and the caution circuit board 42A (LED) emits light (visible light, electromagnetic wave) to the vehicle rear side.

The caution lamp 42 is provided with a caution light guide 42B having a substantially columnar as a second guide part, the caution light guide 42B having a proximal end side part extending to the vehicle rear side from the caution circuit board 42A and a distal end side part extending to the vehicle width direction outer side. The caution light guide 42B is transparent. The caution light guide 42B guides the light emitted from the caution circuit board 42A (LED) in the longitudinal direction and emits the light from the distal end side part to the vehicle rear side.

The lamp unit 36 is provided with a welcome lamp 44 as an electromagnetic wave device (third radiation device). The welcome lamp 44 is provided with a pair of welcome circuit boards 44A as third emission parts. The welcome circuit board 44A is fixed to a part of the vehicle front side and a part of the vehicle rear side of a vehicle width direction intermediate part on the housing 38. The welcome circuit board 44A is provided with an LED (not illustrated) and is electrically connected to the control device 28. Under the control of the control device 28, each welcome lamp 44 is operated, and the welcome circuit board 44A (LED) on the vehicle front side emits light (visible light, electromagnetic wave) to the vehicle rear side, and the welcome circuit board 44A (LED) on the vehicle rear side emits light (visible light, electromagnetic wave) to the vehicle front side.

The welcome lamp 44 is provided with a cover 44B having a rectangular parallelepiped box shape as a shielding member. The cover 44B does not transmit light. The cover 44B extends in the vehicle front-rear direction and is fixed between the welcome circuit boards 44A on the housing 38. The inside of the cover 44B is open upward. Incidence holes 44C having a rectangular shape are formed to penetrate the vehicle width direction central parts of the vehicle front side wall and the vehicle rear side wall of the cover 44B. The incidence holes 44C on the vehicle front side and the vehicle rear side face welcome circuit boards 44A (LED) on the vehicle front side and the vehicle rear side, respectively. A welcome light guide 44D having a substantially rectangular plate-like shape as a third guide part is fixed in the cover 44B. The welcome light guide 44D extends in the vehicle front-rear direction and is fitted in the cover 44B. The welcome light guide 44D is transparent. The welcome light guide 44D guides the light emitted from each of the welcome circuit boards 44A (LED) and incident through each of the incidence holes 44C in the longitudinal direction and emits the light upward.

A transmissive lens 46 having a substantially rectangular parallelepiped box shape as a transmissive member and an outer peripheral member of the housing body is provided in an upper part of the lamp unit 36. The inside of the transmissive lens 46 is open downward, and a vehicle front side part of the vehicle width direction outer side of an outer peripheral wall of the transmissive lens 46 is inclined the vehicle width direction inner side as it goes toward the vehicle front side. The transmissive lens 46 is assembled (fixed) to the housing 38 with the outer peripheral wall thereof fitted to the outside of the outer periphery of the housing 38. The shielding plate 38A of the housing 38, the turn lamp 40, the caution lamp 42, and the welcome lamp 44 are accommodated between the housing 38 and the transmissive lens 46. The transmissive lens 46 is transparent. A shielding film 46A made of, for example, metal as a shielding portion is formed in a part excluding a part of the inner surface (back side surface) of the transmissive lens 46. The shielding film 46A does not transmit light.

On the outer peripheral wall of the transmissive lens 46, a turn lens 46B as a first transmissive part is formed from a part excluding the vehicle front side end part on the vehicle width direction outer side to the vehicle width direction outer side end on the vehicle rear side. The shielding film 46A is not formed in the part where the turn lens 46B of the transmissive lens 46 is formed. The light emitted from the turn light guide 40B of the turn lamp 40 passes through the turn lens 46B to be emitted from the turn lens 46B to the vehicle width direction outer side and the vehicle rear side.

On the outer peripheral wall of the transmissive lens 46, a caution lens 46C as a second transmissive part is formed at a vehicle width direction intermediate part on the vehicle rear side. The shielding film 46A is not formed in the part where the caution lens 46C of the transmissive lens 46 is formed. The light emitted from the caution light guide 42B of the caution lamp 42 passes through the caution lens 46C to be emitted from the caution lens 46C to the vehicle rear side. The caution lens 46C is isolated from the inside of the shielding plate 38A of the housing 38. The light emitted from the turn light guide 40B of the turn lamp 40 is restricted from transmitting through the caution lens 46C to be emitted from the caution lens 46C.

On the upper wall of the transmissive lens 46, a welcome lens 46D as a third transmissive unit is formed in a central part. The shielding film 46A is not formed in the part where the welcome lens 46D of the transmissive lens 46 is formed. The light emitted from the welcome light guide 44D of the welcome lamp 44 passes through the welcome lens 46D to be emitted upward from the welcome lens 46D. The welcome lens 46D has a designed shape ("R" in the present embodiment) such as a character. The designed shape of the welcome lens 46D is illuminated and displayed by light emitted upward from the welcome lens 46D.

Figure 1B:
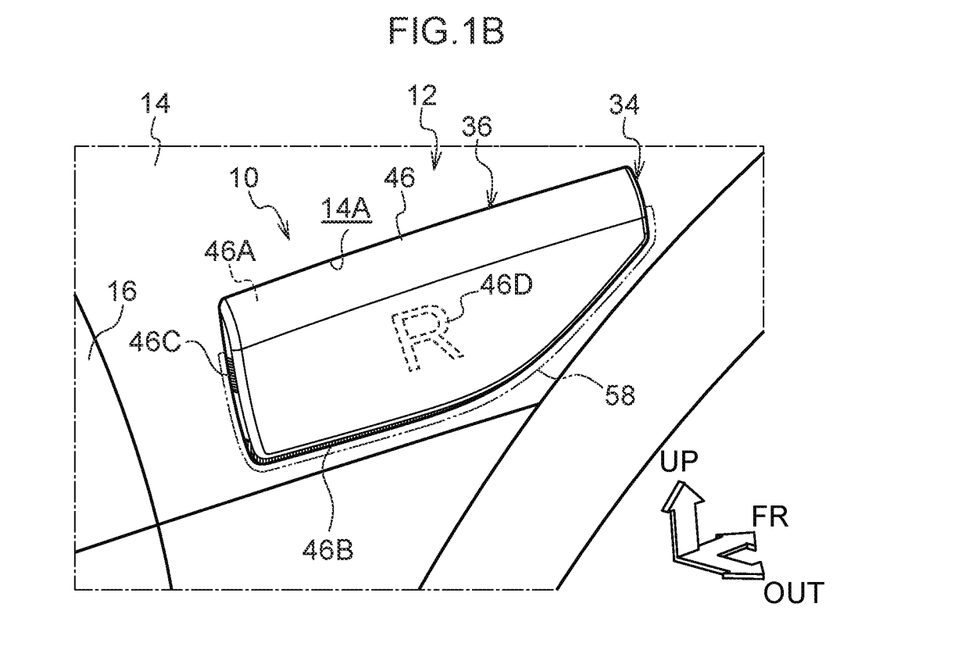
FIG. 1B is a perspective view of the installation body of the camera device according to the embodiment of the present invention when the installation body is stored and viewed from the vehicle rear side and the vehicle width direction outer side.

When the installation body 34 is stored, the transmissive lens 46 protrudes from the fender panel 14 to the vehicle width direction outer side (outside of the fender panel 14), and the turn lens 46B and the caution lens 46C are exposed to the outside of the vehicle 12 in addition to the welcome lens 46D of the transmissive lens 46 (see FIG. 1B).

The installation body 34 is provided with a camera unit 48 as an imaging unit in a lower part thereof.

Figure 5A:
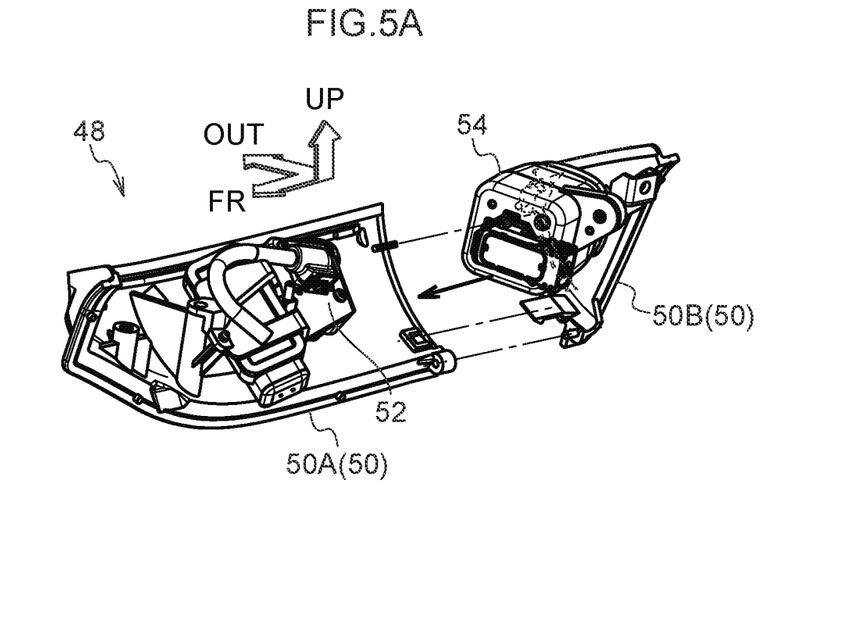
FIG. 5A is an exploded perspective view of the camera unit of the camera device according to the embodiment of the present invention as viewed from the vehicle front side and a vehicle width direction inner side.

The camera unit 48 is provided with a visor 50 (see FIG. 5B) of a frame shape having a U-shaped section as an outer peripheral body on the outer periphery. The inside of the visor 50 is open to upward and the vehicle width direction inner side. The visor 50 is configured by assembling a visor lower 50A and a rim 50B (see FIG. 5A). The visor lower 50A constitutes a lower part and a vehicle front side part of the visor 50, and the rim 50B constitutes a vehicle rear side part of the visor 50. The lower part of the visor 50 (lower part of the visor lower 50A) is curved about the pivot center axis O of the pivoting part 32A of the retractor 32 and is inclined upward as it goes toward the vehicle width direction outer side. The front side part of the lower part of the visor 50 is inclined the vehicle width direction inner side as it goes toward the vehicle front side.

Figure 5B:
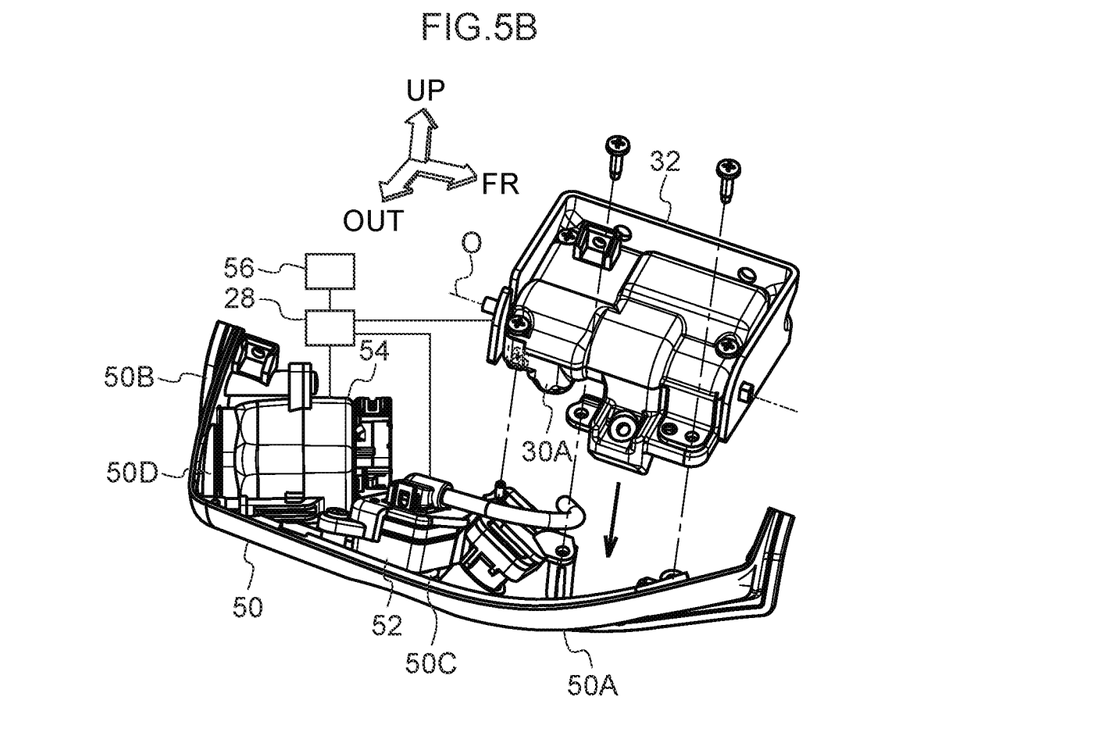
FIG. 5B is an exploded perspective view of the camera unit and a retractor of the camera device according to the embodiment of the present invention as viewed from the vehicle front side and the vehicle width direction outer side.
Figure 6:
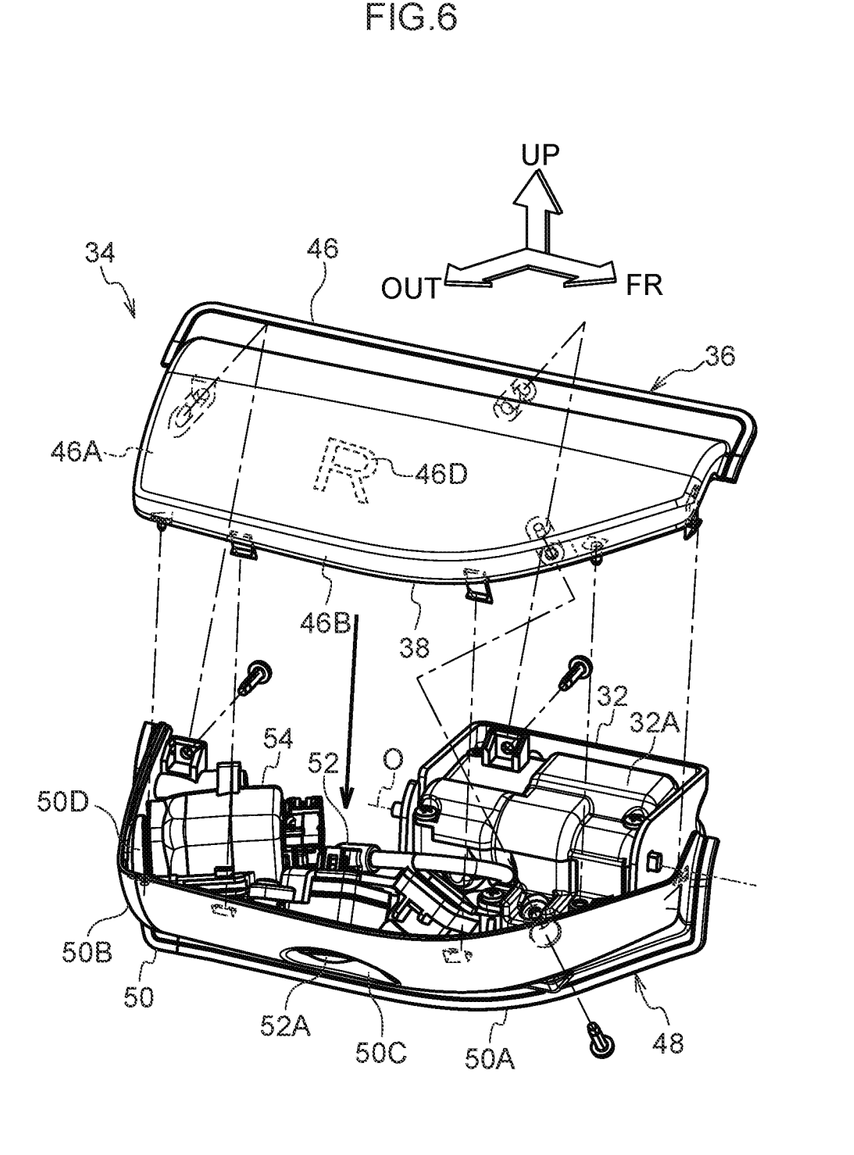
FIG. 6 is an exploded perspective view of the installation body and the retractor of the camera device according to the embodiment of the present invention as viewed from the vehicle front side and the vehicle width direction outer side.

The visor 50 is assembled to the pivoting part 32A of the retractor 32 in the visor lower 50A (see FIG. 5B) and is assembled to the housing 38 of the lamp unit 36 in the visor lower 50A and the rim 50B (see FIG. 6). The visor 50 is rotatable integrally with the pivoting part 32A and the lamp unit 36, and the upper side of the inside thereof is closed by the lamp unit 36.

Figure 4A:
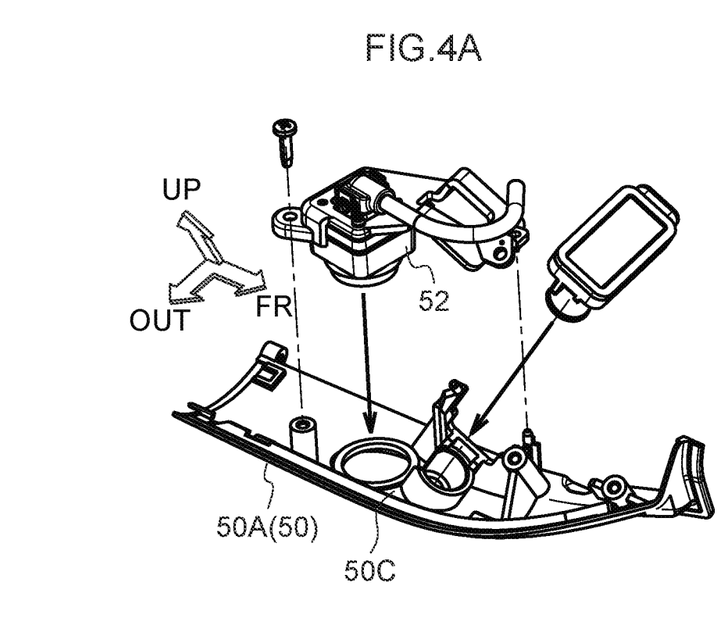
FIG. 4A is an exploded perspective view of a lower camera and the like in a camera unit of the camera device according to the embodiment of the present invention as viewed from the vehicle front side and the vehicle width direction outer side.
Figure 4B:
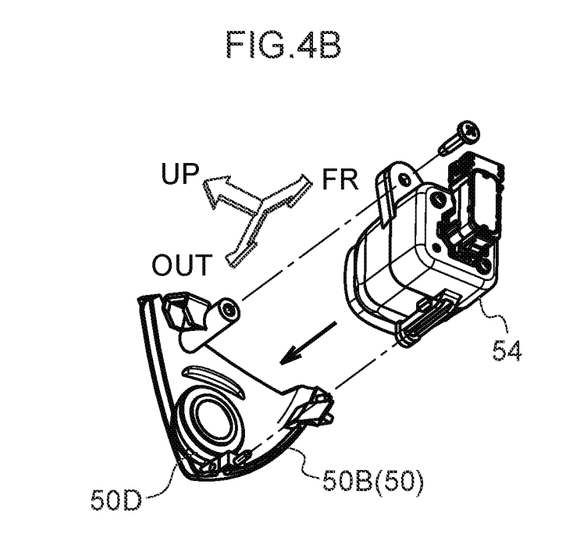
FIG. 4B is an exploded perspective view of a rear camera and the like in the camera unit of the camera device according to the embodiment of the present invention as viewed from the vehicle front side and the vehicle width direction outer side.

A lower exposure cylinder 50C (see FIG. 4A) having a truncated conical tubular shape as an exposed part is formed in the lower part of the visor 50 (lower part of the visor lower 50A). The lower exposure cylinder 50C increases its diameter toward the lower side and the inside of the lower exposure cylinder 50C opens the inside of the visor 50 to the lower side. A rear exposure cylinder 50D (see FIG. 4B) having a truncated conical cylindrical shape as an exposed part is formed in the vehicle rear side part (rim 50B) of the visor 50. The rear exposure cylinder 50D increases its diameter toward the vehicle rear side and the inside of the rear exposure cylinder 50D opens the inside of the visor 50 to the vehicle rear side.

A lower camera 52 (see FIG. 4A) as an imaging device is fixed to the lower part of the visor 50 (lower part of the visor lower 50A). A lens 52A (see FIG. 2) of the lower camera 52 is directed downward and exposed to the lower side of the visor 50 through the inside of the lower exposure cylinder 50C of the visor 50. A rear camera 54 (see FIG. 4B) as an imaging device is fixed to the vehicle rear side part (rim 50B) of the visor 50. A lens 54A (see FIG. 1A) of the rear camera 54 is directed to the vehicle rear side and exposed to the vehicle rear side of the visor 50 through the inside of the rear exposure cylinder 50D of the visor 50.

The lower camera 52 and the rear camera 54 are electrically connected to the control device 28 (see FIG. 5B). Under the control of the control device 28, the lower camera 52 and the rear camera 54 capture images of the lower side and the vehicle rear side of the visor 50 via the lens 52A and the lens 54A, respectively. A monitor 56 (see FIG. 5B) as a display device is electrically connected to the control device 28. Under the control of the control device 28, images captured by the lower camera 52 and the rear camera 54 are displayed on the monitor 56. The monitor 56 is installed in the vehicle interior. The occupant can check the image displayed on the monitor 56.

When the installation body 34 is stored, the camera unit 48 is housed in the vehicle width direction inner side of the fender panel 14 (inside the bracket 30), and the lens 52A of the lower camera 52 and the lens 54A of the rear camera 54 are housed inside the vehicle 12 (see FIG. 1B).

Next, the operation of the present embodiment will be described.

In the camera device 10 having the above configuration, the installation body 34 deploys (see FIG. 1A) as the occupant gets on the vehicle 12.

In the camera unit 48 of the installation body 34, under the control of the control device 28, the lower camera 52 and the rear camera 54 capture images of the lower side and the vehicle rear side of the visor 50, respectively, and images captured by the lower camera 52 and the rear camera 54 are displayed on the monitor 56. The occupant checks the image displayed on the monitor 56, and the view of the occupant on the lower side and the vehicle rear side is supplemented.

When the occupant actuates the operation unit 26 before the occupant changes the traveling direction of the vehicle 12 to the camera device 10 installation side, the turn lamp 40 of the lamp unit 36 in the installation body 34 is actuated under the control of the control device 28, and light is intermittently (blinking) emitted from the turn lens 46B of the transmissive lens 46 to the vehicle width direction outer side and the vehicle rear side. This causes other vehicles and pedestrians on the vehicle width direction outer side and the vehicle rear side of the installation body 34 to be notified that the traveling direction of the vehicle 12 is changed to the installation side of the camera device 10.

When the occupant contacts the doorknob of the side door 16 (when the contact sensor 20 detects the contact of the occupant with the doorknob) to get off the vehicle 12 by opening the side door 16, the caution lamp 42 of the lamp unit 36 is activated, and light is emitted from the caution lens 46C of the transmissive lens 46 to the vehicle rear side under the control of the control of the control device 28. This causes other vehicles and pedestrians on the vehicle rear side of the installation body 34 to be notified that the side door 16 will open.

When the occupant closes the side door 16 after the occupant gets off the vehicle 12 by opening the side door 16 (when the opening/closing sensor 22 detects the closing of the side door 16), the operation of the caution lamp 42 is released and the emission of light from the caution lens 46C stops under the control of the control device 28.

When the occupant performs the lock operation on the lock mechanism 18, the retractor 32 is actuated under the control of the control device 28 to store the installation body 34 (see FIG. 1B).

When the occupant approaches the side door 16 from the outside of the vehicle 12 to get on the vehicle 12 by opening the side door 16 (when the approach sensor 24 detects the approach of the occupant to the side door 16 from the outside of the vehicle 12), the caution lamp 42 is activated to irradiate the vehicle rear side with light from the caution lens 46C under the control of the control device 28. This causes other vehicles and pedestrians on the vehicle rear side of the installation body 34 to be notified that the side door 16 will open. At this time, under the control of the control device 28, the welcome lamp 44 of the lamp unit 36 is operated, and light is emitted upward from the welcome lens 46D of the transmissive lens 46. This causes the designed shape of the welcome lens 46D to be illuminated and displayed to notify the occupant that the occupant has approached the side door 16 of the vehicle 12.

When the occupant performs the unlock operation on the lock mechanism 18 to open the side door 16 (when the opening/closing sensor 22 detects the opening of the side door 16), the retractor 32 is activated under the control of the control device 28 to deploy the installation body 34 (see FIG. 1A).

When the occupant gets in the vehicle 12 and closes the side door 16 (when the opening/closing sensor 22 detects the closing of the side door 16), the operation of the caution lamp 42 is released and the emission of light from the caution lens 46C stops under the control device 28. After that, the operation of the welcome lamp 44 is released, and the irradiation of light from the welcome lens 46D stops under the control of the control device 28.

Here, the lamp unit 36 is provided with the turn lamp 40, the caution lamp 42, and the welcome lamp 44. Thus, a space between the turn lamp 40, the caution lamp 42, and the welcome lamp 44 can be reduced. As a result, the arrangement space of the turn lamp 40, the caution lamp 42, and the welcome lamp 44 can be reduced, and the installation body 34 can be downsized. In addition, it is possible to easily integrate (commonalize) the turn circuit board 40A of the turn lamp 40, the caution circuit board 42A of the caution lamp 42, and the welcome circuit board 44A of the welcome lamp 44, and it is possible to simplify the wiring to the turn circuit board 40A, the caution circuit board 42A, and the welcome circuit board 44A, which can reduce the cost.

The turn lens 46B corresponding to the turn lamp 40, the caution lens 46C corresponding to the caution lamp 42, and the welcome lens 46D corresponding to the welcome lamp 44 are provided in the transmissive lens 46 of the lamp unit 36. Thus, it is possible to share the transmissive lens 46 between the turn lamp 40, the caution lamp 42, and the welcome lamp 44, which can simplify the configuration and reduce the number of assembling steps. In addition, since the transmissive lens 46 constitutes the design of the installation body 34, the design of the installation body 34 can be improved by the transmissive lens 46.

The lamp unit 36 is assembled by assembling the transmissive lens 46 to the housing 38 in a state where the turn lamp 40, the caution lamp 42, and the welcome lamp 44 are assembled to the housing 38 of the lamp unit 36. The lamp unit 36 thus can be easily assembled. In addition, water entering the turn lamp 40, the caution lamp 42, and the welcome lamp 44 can be restricted by the common housing 38 and the transmissive lens 46, which can simplify the configuration.

When the installation body 34 is stored, the transmissive lens 46 protrudes to the vehicle width direction outer side from the fender panel 14, and the turn lens 46B and the caution lens 46C are exposed to the outside of the fender panel 14 in addition to the welcome lens 46D of the transmissive lens 46 (see FIG. 1B). This enables irradiation of the outside of the fender panel 14 with light from the turn lens 46B and the caution lens 46C with the installation body 34 being stored.

In the present embodiment, a flange 58 having a substantially U-shaped plate shape in a front view as a covering part may be integrally provided at a lower end of the outer peripheral surface of the transmissive lens 46 on the vehicle width direction outer side from the vehicle width direction middle (see FIG. 1A). In this case, the flange 58 protrudes outside the outer periphery of the transmissive lens 46, and when the installation body 34 is stored, the flange 58 closes the gap between the outer periphery of the installation hole 14A of the fender panel 14 and the installation body 34 (see FIG. 1B). This can inhibit the gap between the outer periphery of the installation hole 14A and the installation body 34 from being visually recognized when the installation body 34 is stored.

In the present embodiment, the turn lamp 40, the caution lamp 42, and the welcome lamp 44 are electromagnetic wave devices and emit visible light (electromagnetic wave). However, the electromagnetic wave devices may be infrared radiation devices to emit infrared rays (electromagnetic waves). The electromagnetic wave devices may be detection devices such as radars to detect a detection target such as other vehicles and pedestrians by emitting and receiving electromagnetic waves. The electromagnetic wave devices may be imaging devices similar to the lower camera 52 and the rear camera 54 to capture images by receiving light (electromagnetic wave).

In the present embodiment, three electromagnetic wave devices (the turn lamp 40, the caution lamp 42, and the welcome lamp 44) are provided in the electromagnetic wave unit (the lamp unit 36). However, it is sufficient that two or more electromagnetic wave devices are provided in the electromagnetic wave unit.

In the present embodiment, two outer peripheral members (the housing 38 and the transmissive lens 46) are provided in the electromagnetic wave unit (the lamp unit 36). However, three or more outer peripheral members may be provided in the electromagnetic wave unit.

In the present embodiment, two imaging devices (the lower camera 52 and the rear camera 54) are provided in the imaging unit (the camera unit 48). However, one or three or more imaging devices may be provided in the imaging unit.

In the present embodiment, the camera device 10 is installed on the fender panel 14 of the vehicle 12. However, the camera device 10 may be installed in a part other than the fender panel 14 of the vehicle 12.

The disclosure of Japanese Patent Application No. 2020-34182 filed on Feb. 28, 2020 is incorporated herein by reference in its entirety.

REFERENCE SIGNS LIST

10 Camera device (installation device)
12 Vehicle
34 Installation body
36 Lamp unit (electromagnetic wave unit)
38 Housing (outer peripheral member)
40 Turn lamp (electromagnetic wave device)
42 Caution lamp (electromagnetic wave device)

44 Welcome lamp (electromagnetic wave device)
46 Transmissive lens (transmissive member and outer peripheral member)
48 Camera unit (imaging unit)
52 Lower camera (imaging device)
54 Rear camera (imaging device)
58 Flange (covering part)

The invention claimed is:

1. An installation device, comprising:
an installation body to be installed at a vehicle;
an electromagnetic wave unit, being a component of the installation body, the electromagnetic wave unit being provided with a plurality of electromagnetic wave devices that emit and/or receive an electromagnetic wave between the electromagnetic wave devices and an outside of the installation body via a transmissive member; and
an imaging unit, being a component of the installation body, the imaging unit being assembled with the electromagnetic wave unit and being provided with an imaging device that images the outside of the installation body.

2. The installation device according to claim 1, wherein the transmissive member is provided at the electromagnetic wave unit, the transmissive member transmitting the electromagnetic wave between the outside of the installation body and the plurality of electromagnetic wave devices.

3. The installation device according to claim 1, wherein the electromagnetic wave unit protrudes from the vehicle when the installation body is stored.

4. The installation device according to claim 1, further comprising a covering part provided at the installation body, the covering part covering a gap between the installation body and the vehicle when the installation body is stored.

5. The installation device according to claim 1, further comprising a plurality of outer peripheral members provided at an outer periphery of the electromagnetic wave unit, the outer peripheral members being assembled to each other to assemble the electromagnetic wave unit.

6. The installation device according to claim 5, wherein at least one of the outer peripheral members shields the electromagnetic wave.

7. The installation device according to claim 1, wherein the imaging unit is housed inside the vehicle when the installation body is stored.

8. The installation device according to claim 1, further comprising a plurality of emission parts respectively provided at the plurality of electromagnetic wave devices, each of the plurality of emission parts emitting the electromagnetic wave, and the plurality of emission parts being integrated with each other.

9. The installation device according to claim 1, further comprising a guide part provided at each of the electromagnetic wave devices, the guide part guiding the electromagnetic wave.

10. The installation device according to claim 1, further comprising a shielding part provided at the electromagnetic wave unit, the shielding part shielding the electromagnetic wave.

11. An installation device, comprising:
an installation body to be installed at a vehicle;
an electromagnetic wave unit, being a component of the installation body, the electromagnetic wave unit being provided with a plurality of electromagnetic wave devices that process an electromagnetic wave between the electromagnetic wave devices and an outside of the installation body; and
an imaging unit, being a component of the installation body, the imaging unit being assembled with the electromagnetic wave unit and being provided with an imaging device that images the outside of the installation body, the imaging unit being housed inside the vehicle when the installation body is stored, and the imaging unit being developed outside the vehicle when the installation body is deployed.

* * * * *